(12) United States Patent
McCorkendale et al.

(10) Patent No.: US 8,938,508 B1
(45) Date of Patent: Jan. 20, 2015

(54) CORRELATING WEB AND EMAIL ATTRIBUTES TO DETECT SPAM

(75) Inventors: Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 732 days.

(21) Appl. No.: 12/841,559

(22) Filed: Jul. 22, 2010

(51) Int. Cl.
*G06F 15/16* (2006.01)
(52) U.S. Cl.
USPC ............................ 709/206; 705/14.1; 709/207
(58) Field of Classification Search
USPC ........................................................ 709/206
See application file for complete search history.

(56) References Cited

U.S. PATENT DOCUMENTS

2004/0258044 A1* 12/2004 Girouard et al. ............. 370/352
2005/0235041 A1* 10/2005 Salamuniccar ............... 709/206
2005/0289148 A1* 12/2005 Dorner et al. .................. 707/10
2009/0006569 A1*  1/2009 Morss et al. .................. 709/206
2011/0035451 A1*  2/2011 Smith et al. ................... 709/206

* cited by examiner

*Primary Examiner* — Hua Fan
(74) *Attorney, Agent, or Firm* — Fenwick & West LLP (57) ABSTRACT

A computer correlates web and email attributes to detect spam. A security module on a client collects attributes of a web site to which an email address was submitted and attributes of an email message sent to the email address that was previously submitted. The security module analyzes the attributes of the web site and the email message to determine whether the email message was sent to the email address responsive to the submission of the email address to the web site. Based on the analysis, the security module determines whether the email message is spam. A machine learning module on a security server establishes training data describing the attributes of the web site to which email addresses were submitted and attributes of legitimate emails received in response to the address submissions. The machine learning module generates an attributes classifier for the security module for spam detection.

18 Claims, 5 Drawing Sheets

CORRELATING WEB AND EMAIL ATTRIBUTES TO DETECT SPAM

BACKGROUND

1. Field of Art

The disclosure generally relates to computer security and in particular to spam detection.

2. Description of the Related Art

Electronic messaging has become a primary means of communication for many individuals and businesses. However, the increased use of electronic messaging has been accompanied by an increase in electronic unsolicited commercial messages, or "spam." Spammers abuse electronic messaging systems by harvesting or deducing electronic message addresses and sending spam to those addresses. For example, spammers can use "scavenger bots" to gather email addresses from mail-to links on web pages and from other locations, and then send spam emails to those addresses.

In order to reduce or eliminate the problem of spam, messaging clients or servers conventionally depend on spam filters that detect and remove spam from the messaging stream. Traditionally, spam filters determine whether a given message is spam based on the content of the message. For example, the creator of the spam filter can use spam trap applications such as "honeypots" to receive spam messages so that the messages' content can be examined and used to create spam filters.

However, spammers are developing increasingly sophisticated techniques for evading spam filters. As a result, it is increasingly difficult to create spam filters that use message content to detect spam and have an acceptable rate of false positive and false negative detections. Therefore, there is a need for improved spam-detection techniques.

SUMMARY

The above and other needs are met by methods, computer-readable storage media, and systems for detecting spam using attributes associated with web servers and email messages.

One aspect provides a computer-implemented method for detecting spam email messages. Embodiments of the method comprising collecting attributes of a web site to which an email address was submitted and attributes of an email message sent to the email address. The method further comprises analyzing the attributes of the web site and the email message to determine whether the email message was sent to the email address responsive to the submission of the email address to the web site. Responsive at least in part to the analysis, the method determines whether the email message is spam.

Another aspect provides an non-transitory computer-readable storage medium storing executable computer program instructions for detecting spam email messages. The computer-readable storage medium stores computer program instructions for collecting attributes of a web site to which an email address was submitted and attributes of an email message sent to the email address. The computer-readable storage medium further comprises computer program instructions for analyzing the attributes of the web site and the email message to determine whether the email message was sent to the email address responsive to the submission of the email address to the web site. The computer-readable storage medium further comprises computer program instructions for determining whether the email message is spam responsive at least in part to the analysis.

Still another aspect provides a computer system for detecting spam email messages. The system comprises a non-transitory computer-readable storage medium storing executable computer program modules including a training data module, a classifier generation module and a reporting module. The training data module is for establishing training data, which describe attributes of web sites to which email addresses were submitted and attributes of legitimate emails received in response to the address submissions. The classifier module is for using the training data to generate a classifier and the reporting module is for sending the classifier to a plurality of clients for detecting spam email messages received at the clients.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 1:
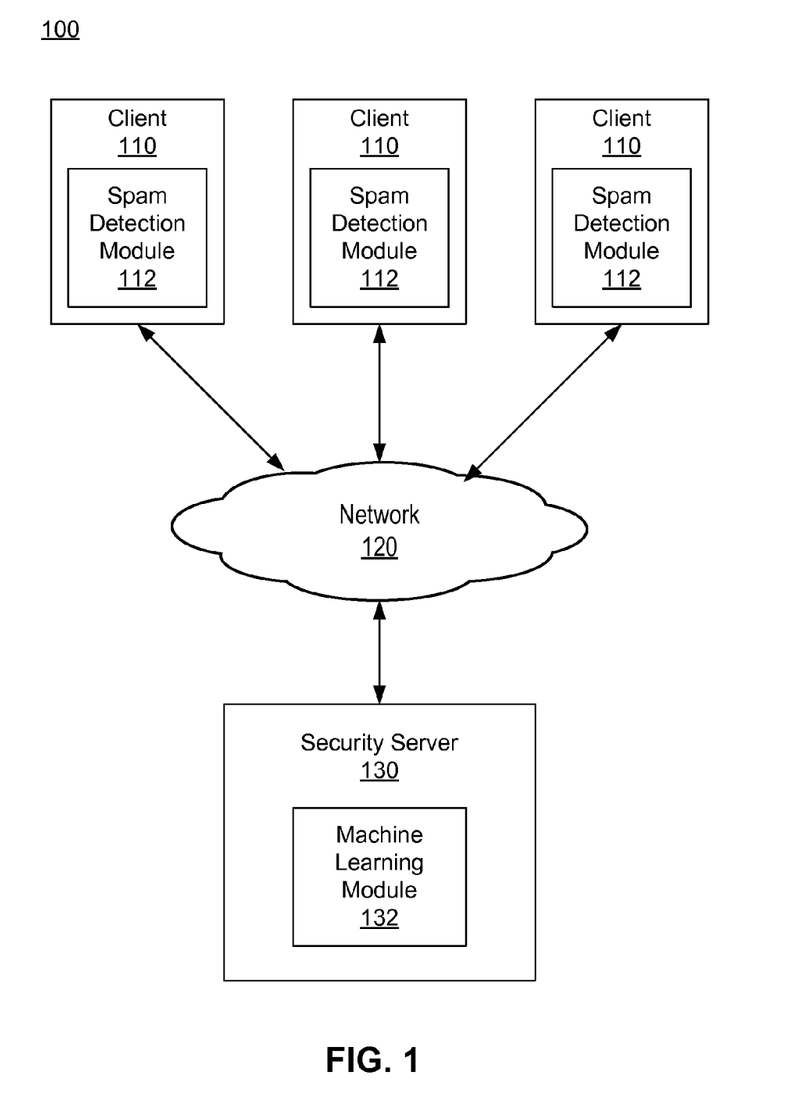
FIG. 1 is a high-level block diagram of a computing environment according to one embodiment.

FIG. 1 is a high-level block diagram of a computing environment 100 for using attributes associated with web and mail servers for spam detection according to one embodiment. FIG. 1 illustrates a security server 130 and three clients 110 connected by a network 120. The illustrated environment 100 represents a typical computing environment where multiple clients 110 interact with the security server 130 to perform security-related tasks such as identifying and remediating malware, and detecting spam. Only three clients 110 are shown in FIG. 1 in order to simplify and clarify the description. Embodiments of the computing environment 100 can have many clients 110 and security servers 130 connected to the network 120.

The client 110 is used by a user to perform tasks such as browsing web sites on the network 120 and sending/receiving electronic messages such as emails. In one embodiment, the client 110 is a personal computer (PC) such as a desktop or notebook computer. In other embodiments, the client 110 is a mobile telephone, personal digital assistant, or other electronic device. For purposes of this description, the term "client" also includes computers such as servers and gateways that encounter and/or filter email messages. For example, a client 110 can be a mail server or an intermediate device between a mail sever and a network endpoint.

The client 110 executes a spam detection module 112 that monitors activities on the client and detects spam messages. In one embodiment, the spam detection module 112 detects when the client 110 submits an email address to a web site or other entity on the network 120. For example, the spam detection module 112 can detect when a user uses the client 110 to interact with a web site and provide an email address in order to register with the site. The spam detection module 112 collects attributes associated with the web sites (e.g., of the web servers hosting the web sites) to which the client 110 sent the email addresses. The spam detection module 112 also detects when the client 110 receives email directed to the email addresses that the client previously sent to a web site. Upon receiving such an email, the spam detection module 112 collects attributes associated with the one or more mail servers that sent the email.

The spam detection module 112 determines whether the received email is spam. In one embodiment, the spam detection module 112 identifies any correlations between the collected attributes of the web site and email server, and uses such correlations (or the lack thereof) as signals indicating whether the email is spam. Generally, a strong correlation indicates a decreased likelihood that an email is spam. For example, if the user of the client 110 sends an email address to a web site as part of a registration process, one can presume that emails sent to that email address by the web site are legitimate (i.e., not spam). The mail servers that send such legitimate emails are likely to have attributes that correspond with the web site to which the client 112 provided the email address. Conversely, attributes of mail servers that send spam emails are likely to have little, if any, correlation with the web sites to which the client 112 provided the email address. Thus, the spam detection module 112 uses the degrees of correlation, along with other signals such as signals based on the content of the email messages, to determine whether email messages received by the client 110 are spam. The spam detection module 112 can perform one or more reporting actions, such as blocking or filtering an email message that it determines to be spam.

The security server 130 interacts with the clients 110 via the network 120 to provide information used by the clients for tasks such as malware and spam detection. A machine learning module 132 at the security server 130 learns attributes of web sites and mail servers that are germane for determining whether a mail server is related to a web site. In one embodiment, the machine learning module 132 learns the attributes by training using training data. The training data describe attributes of web sites to which email addresses were submitted and attributes of legitimate emails received as a result of the address submissions. The training data can be manually generated by, for example, sending email addresses to known legitimate web sites and pairing the attributes of those web sites with the attributes of emails manually deduced to have come from affiliated mail servers in response to the submissions. The training data can also be automatically generated based on data received from the spam detection modules 112 at the clients 110 and/or from other sources.

The machine learning module 132 uses the training data to train an attributes classifier (and/or another machine learning component). The trained classifier indicates the correlation of attributes associated with web sites and mail servers that are important for spam detection. The security server 130 provides the attributes classifier to the clients 110. The spam detection modules 112 of the clients 110 use the attributes classifier to identify spam. Using the classifier in this way thus improves the accuracy of spam detection by making it less likely that a legitimate email from a web site to which the user submitted an email address is classified as spam, and also by improving detection of spam emails.

The network 120 enables communications among the clients 110 and the security server 130 and can comprise the Internet. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
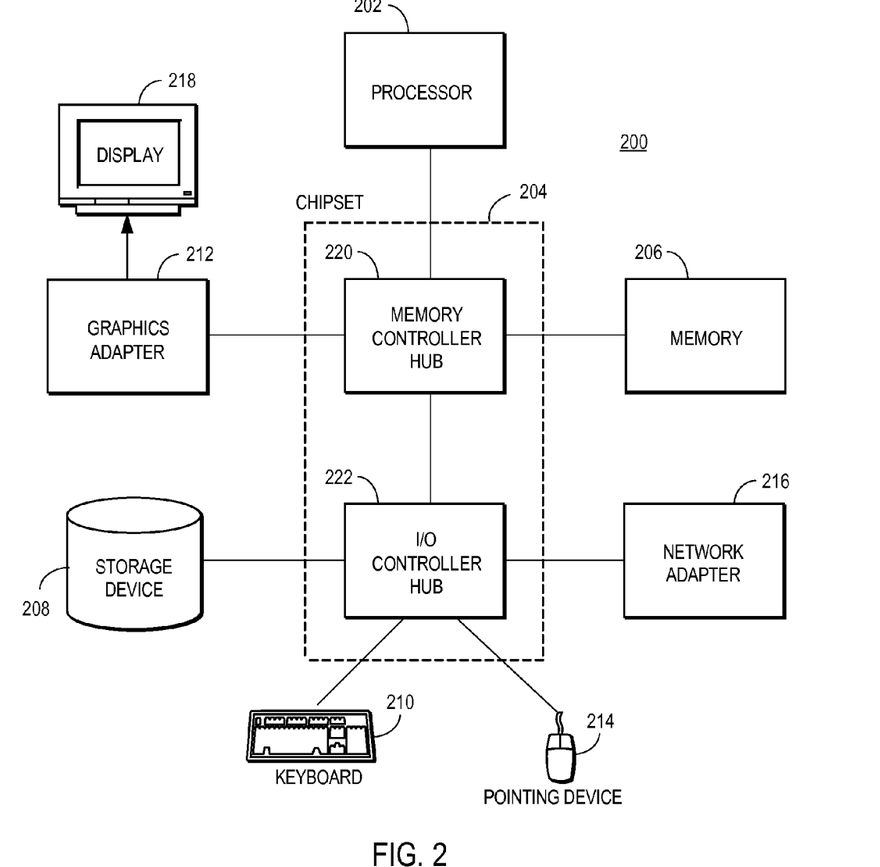
FIG. 2 is a high-level block diagram illustrating a typical computer for use as a client or security server.

FIG. 2 is a high-level block diagram of a computer 200 for acting as a client 110 and/or as a security server 130. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a reputation server 140 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module"

refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
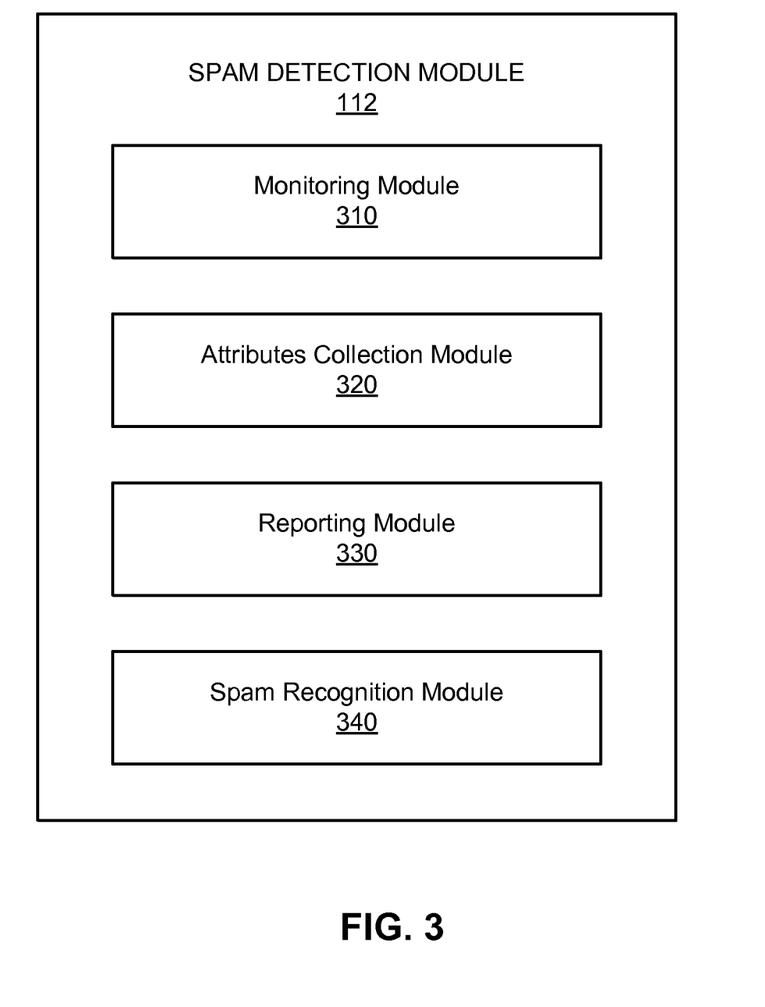
FIG. 3 is a block diagram illustrating a spam detection module according to one embodiment.

FIG. 3 illustrates an embodiment of the spam detection module 112 of a client 110. The spam detection module 112 comprises various modules including a monitoring module 310, an attributes collection module 320, a reporting module 330 and a spam recognition module 340. In alternate embodiments, the spam detection module 112 may comprise additional and/or different modules than the ones described here. Moreover, the functions can be distributed among the modules in different ways than described here.

The monitoring module 310 monitors the client 110 to detect activities including transmitting email addresses to web sites and receiving email messages from mail servers. In one embodiment, the user provides the user's email address to the monitoring module 310. The monitoring module 310 monitors ports at the client 110 carrying outbound web traffic and detects any traffic containing the email address. In response to the monitoring module 310 detecting traffic containing the email address, the monitoring module 310 identifies the web site (i.e., destination address) to which the email address is destined. For example, in response to a user using a web browser to submit his/her email address to a newspaper web site at www.newspaper.com, the monitoring module 310 detects the outbound web traffic containing the email address and also identifies the web server hosting the web site www.newspaper.com as the destination of the address. In addition, an embodiment of the monitoring module 310 monitors ports at the client 110 carrying inbound email traffic and identifies inbound email messages directed to the email address that was previously submitted to a web site.

The attributes collection module 320 communicates with the monitoring module 310 and collects attributes associated with the web sites to which the email address is submitted and the mail servers from which email messages to the submitted address are received. While FIG. 3 shows the attributes collection module 320 within the client 110, the module or equivalent functionality can be located in the security server 130 in other embodiments.

For a web site to which an email address was submitted, the attributes collection module 320 collects one or more directly observable primary attributes describing the web site. In one embodiment, the primary attributes include the IP address of the web server operating the web site and the Domain Name System (DNS) name of the web server. The attributes collection module 320 further collects one or more secondary attributes that are derived from the primary attributes. In one embodiment, a secondary attribute of the IP address of the web server includes geolocation data derived from the IP address. The geolocation data describe the geographical location of the web server, and may indicate a city, state, country, or other region in which the server having the IP address is known to be located.

Another secondary attribute associated with the IP address is whether the IP address is within a range known to be associated with an Internet Service Provider (ISP). For example, the IP address may indicate that the web site is hosted by a server connected to the network 120 via a DSL, cable, or dial-up modem. Other embodiments may include different or additional attributes associated with the IP address of the detected web server.

The secondary attributes associated with the DNS name of a web server include information about the domain name registrar at which the domain name for the web server is registered, the name and address of the registrant, the age of the registration, the one or more IP addresses that the DNS name resolves to, and other domain names registered by the registrant. Different or additional attributes associated with the DNS name of the web server may be included in other embodiments.

For an email message received by the client 110 at the submitted email address, the attributes collection module 320 collects one or more primary and secondary attributes associated with the mail server or servers that sent the email message to the client 110. The primary attributes of the mail server include the DNS name of the "from" address of the email message, and the IP address and DNS name of the originating mail server. Likewise, the attributes collection module 320 can collect secondary attributes based on these primary attributes, including the same secondary attributes described above with respect to web site attributes. The attributes collection module 320 can also collect primary and secondary attributes of any other mail transfer agents (MTA's, or intermediate mail servers) involved in delivering the email message from the source to the destination. In one embodiment, the attributes collection module 320 further collects attributes associated with the SMTP mail session of the email transmission, such as server connection banners and message headers.

A reporting module 330 receives the collected attributes from the attribute collection module 320. In one embodiment, the reporting module 330 composes reports describing the attributes and sends the reports to the security server 130. The security server 130 can use the reports to generate training data for machine learning, and/or for other purposes. Different embodiments can provide different information in the reports. For example, one embodiment reports only primary attributes, such as the IP address and DNS name of a detected web/mail server. Another embodiment provides some or all of the secondary attributes instead of, or in addition to, the primary attributes. In one embodiment, the reporting module 330 sends the reports to the security server 130 upon receiving the attributes from the attributes collection module 320. In other embodiments, the reporting module 330 stores the attributes data locally for a period of time and then sends reports for the accumulated attributes data in batch at specified times, such as once a day. Further, in some embodiments the reporting module 330 is absent and the client 110 does not send the attributes to the security server 130.

The spam recognition module 340 analyzes the collected attributes of web sites to which email addresses were submitted in view of attributes of an email message sent to the email address to determine whether the email message is spam. In one embodiment, the spam recognition module 340 receives the attributes classifier from the security module 130 and uses the classifier to analyze the collected attributes. Specifically, the spam recognition module 340 determines whether an email message received by the client 110 is spam by applying the attributes classifier to the attributes for that message and the attributes of web sites to which the client 110 has submitted the email address to which the message was sent. By using the attributes classifier, the spam recognition module 340 can reduce false positive detections of spam by recognizing when an email message is a legitimate message from a web site to which the user has submitted his or her email address. Likewise, the classifier can help the spam recognition module 340 more accurately detect true spam. As mentioned above, in one embodiment the output of the attributes classifier is only one signal out of multiple signals that the spam recognition module 340 uses to detect spam.

Figure 4:
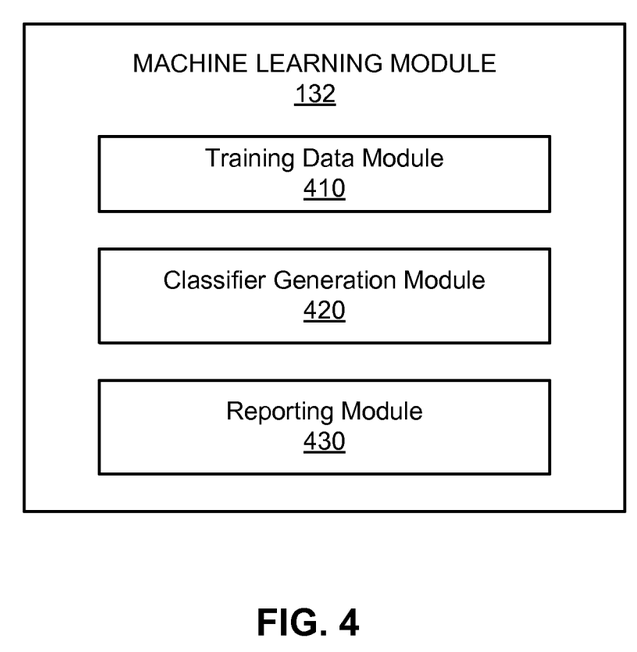
FIG. 4 is a block diagram illustrating a machine learning module according to one embodiment.

FIG. 4 is a block diagram illustrating the machine learning module 132 of the security server 130 according to one embodiment. The machine learning module 132 comprises various modules including a training data module 410, a classifier generation module 420 and a reporting module 430. In alternate embodiments, the machine learning module 132 may comprise additional and/or different modules than the ones described here. Moreover, the functions can be distributed among the modules in different ways than described here.

In one embodiment, the training data module 410 establishes training data used for training the classifier. As discussed above, the training data describe attributes of web sites to which email addresses were submitted and attributes of legitimate emails received in response to the address submissions. The training data can be received from the reporting modules 330 of the clients 110. In addition, the training data can be received from dedicated training data collection systems, such as honeypots and/or web crawlers that submit email addresses to web sites and monitor for email messages sent in response to the submissions. In addition, the training data can be manually generated. The training data can also include attributes of known spam email messages and/or of web sites known to send spam messages.

The classifier generation module 420 generates the attributes classifier using the training data. In one embodiment, the classifier generation module 420 uses the training data to generate feature vectors having features describing the attributes of the web sites and mail servers referenced in the training data. The classifier generation module 420 trains the classifier using the feature vectors. Through the training, the attributes classifier learns weights describing the relative importance of the features in recognizing when an email message was received in response to an email address submission to a web site. Thus, the trained attributes classifier can receive attributes describing web sites to which an email address was submitted and attributes describing an email message received at that address, and produce an output indicating whether the message was received in response to an address submission.

The type of attributes classifier produced by the classifier generation module 420 can vary in different embodiments. For example, in one embodiment the attributes classifier is a decision tree classifier. A decision tree classifier has a tree structure that includes branch nodes and leaf nodes. Each branch node specifies an attribute (splitting attribute) and a test (splitting test) to be carried out on the value of the splitting attribute, and branches out to other nodes for all possible outcomes of the splitting test. Each leaf node represents a classification (e.g., whether an attribute is important in spam detection). The leaf nodes can also contain additional information about the represented classification such as a confidence score that measures a confidence in the represented classification (i.e., the likelihood of the classification being accurate).

Other embodiments generate different types of classifiers. Moreover, the term "classifier" as used herein can refer to an executable module, to a data set that is consumed by another executable module, and/or a combination of executable code and non-executable data. In one embodiment the attributes classifier produced by the classifier generation module 420 is executable by the clients 110 to detect spam. In another embodiment, the attributes classifier is a data set used by executable code at the clients 110 to detect spam. For example, the data set forming the classifier can include a data model describing the classifier, definitions of attributes, weights of the attributes, etc.

The reporting module 430 provides the attributes classifier to the clients 110. Depending upon the embodiment, the reporting module 430 can push the classifier to the clients 110 and/or provide the classifier in response to requests from the clients. The reporting module 430 can also provide updated classifiers as new or revised classifiers generated by the classifier generation module 420. For an attributes classifier in the form of an attributes data set, the reporting module 430 can provide an updated data set (e.g., updated attributes definitions and weights) to the clients 110. The clients 110 uses the data set to update its existing attributes classifier.

Figure 5:
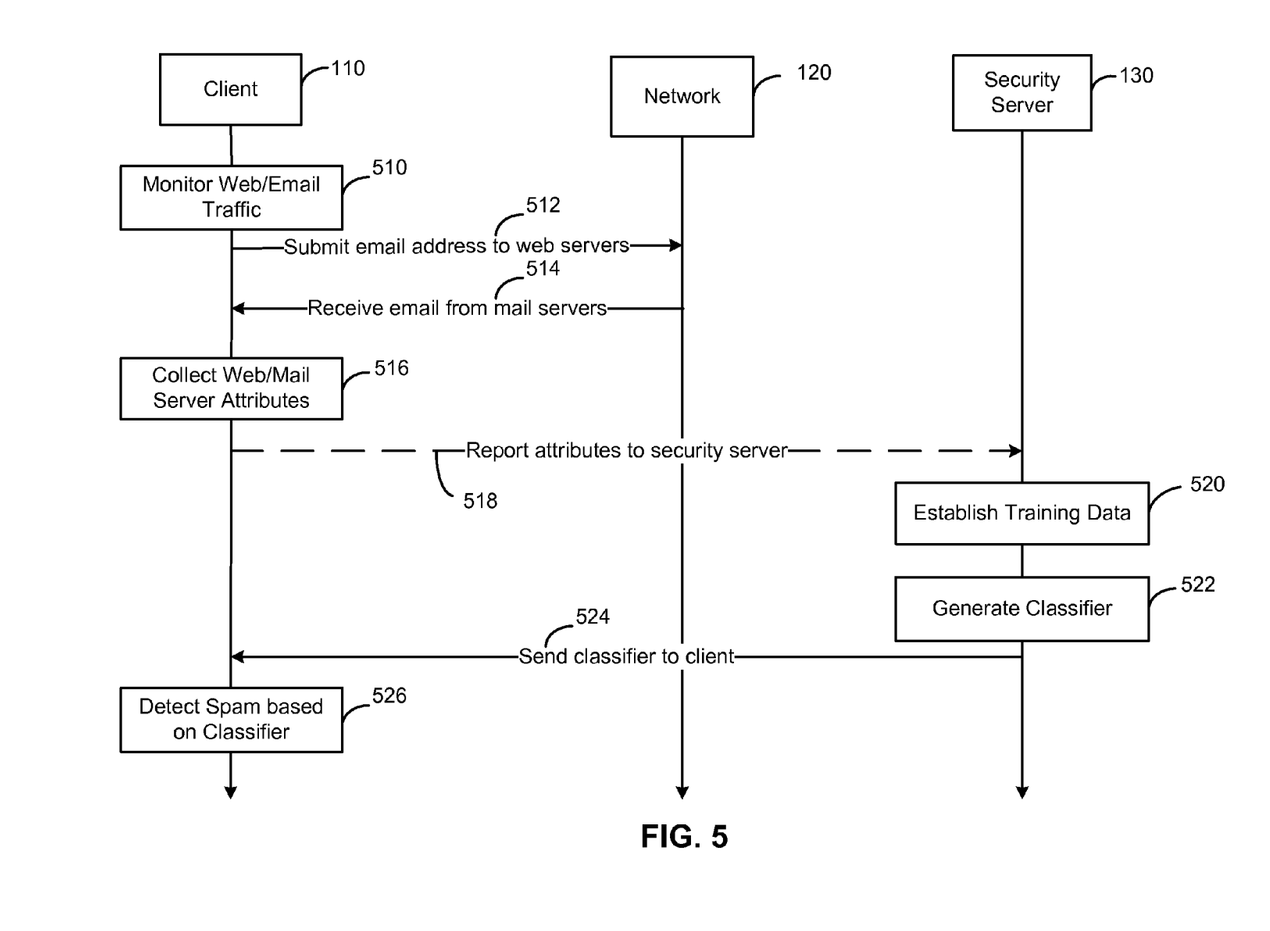
FIG. 5 is a transaction diagram illustrating interactions between a client and a security server for spam detection according to one embodiment.

FIG. 5 is a transaction diagram illustrating interactions between a client 110 and a security server 130 for spam detection according to one embodiment. Other embodiments perform the illustrated interactions in different orders, and/or perform different or additional interactions. For example, collecting the attributes of web and mail servers can be implemented at the client 110 or at the security server 130. Moreover, some of the interactions can be performed by entities other than the entities illustrated in FIG. 5.

Initially, the spam detection module 112 monitors 510 web and email traffic at a client 110. During the monitoring, the spam detection module 112 detects 512 an email address being submitted to web sites. In addition, the spam detection module 112 detects 514 the client 110 receiving email messages directed to the submitted address. The spam detection module 112 collects attributes 516 of the web sites to which the email address was submitted, as well as attributes of the mail servers and/or email messages received at the address. Optionally, the spam detection module 112 reports 518 the collected attributes to the security server 130.

The security server 130 establishes 520 training data describing attributes of web sites to which email addresses were submitted and email messages received at that address in response to the submissions. The training data can include the attributes reported by the client 110 and/or training data from other sources. The security server 130 uses the training data to generate 522 an attributes classifier. The security server 130 sends 524 the attributes classifier to the client 110. The spam detection module 112 at the client 110 uses the classifier to detect 526 spam.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for spam detection and analysis through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of detecting spam email messages comprising: using a computer to perform steps comprising:
    collecting attributes of a web site to which an email address was submitted;
    collecting attributes of an email message sent to the email address;
    identifying a degree of correlation between at least one of the collected attributes of the web site and at least one of the collected attributes of the email message, the identifying comprising using a classifier to analyze the at least one collected attribute of the web site and the at least one collected attribute of the email message, wherein the analysis is based at least in part on a plurality of weights describing different values that represent the relative importances of the collected attributes of the web site and email message, wherein the classifier is generated by training on training data describing attributes of training web sites to which email addresses were submitted and legitimate emails received responsive to the submissions of the email addresses to the training web sites, generating the classifier comprising:
        generating feature vectors from the training data, the feature vectors having features describing the attributes of the training web sites and having features describing the attributes of the legitimate emails received responsive to the submissions of the email addresses to the training web sites; and
        training the classifier using the feature vectors, the training causing the classifier to learn weights describing relative importances of the features in recognizing when email messages are received in response to email addresses submitted to web sites; and
    determining whether the email message is spam responsive at least in part to the degree of correlation, a stronger correlation indicating a decreased likelihood that the email message is spam.

2. The method of claim 1, wherein collecting attributes of the web site to which an email address was submitted comprises:
    collecting one or more primary attributes describing the web site; and
    collecting one or more secondary attributes derived from the primary attributes.

3. The method of claim 2, wherein the primary attributes describing the web site comprise at least one of an Internet Protocol (IP) address and a Domain Name System (DNS) name of a web server hosting the web site.

4. The method of claim 2, wherein the secondary attributes derived from the primary attributes comprise at least one of geolocation data describing a geographic location of a web server hosting the web site, whether an IP address of the web server is known to be associated with an Internet Service Provider (ISP), information about a domain name registrar at which the DNS name for the web server is registered, and information about a registrant of the DNS name.

5. The method of claim 1, wherein collecting attributes of an email message sent to the email address comprises:
    collecting one or more primary attributes describing the email message; and
    collecting one or more secondary attributes derived from the primary attributes.

6. The method of claim 5, wherein the primary attributes describing the email message comprise at least one of a DNS name of a "from" address of the email message, an IP address of a mail server involved in sending the email message, a DNS name of the mail server involved in sending the email message, and attributes of a mail session involved in transmitting the email message.

7. The method of claim 5, wherein the secondary attributes derived from the primary attributes comprise at least one of geolocation data describing a geographic location of the mail server involved in sending the email message, whether the IP address of the mail server is known to be associated with an ISP, information about a domain name registrar at which the DNS of the web server is registered, and information about a registrant of the DNS name.

8. A non-transitory computer-readable storage medium storing executable computer program instructions for detecting spam email messages, the computer program instructions comprising instructions for:
    collecting attributes of a web site to which an email address was submitted;
    collecting attributes of an email message sent to the email address;
    identifying a degree of correlation between at least one of the collected attributes of the web site and at least one of the collected attributes of the email message, the identifying comprising using a classifier to analyze the at least one collected attribute of the web site and the at least one collected attribute of the email message, wherein the analysis is based at least in part on a plurality of weights describing different values that represent the relative importances of the collected attributes of the web site and email message, wherein the classifier is generated by training on training data describing attributes of training web sites to which email addresses were submitted and legitimate emails received responsive to the submissions of the email addresses to the training web sites, generating the classifier comprising:

generating feature vectors from the training data, the feature vectors having features describing the attributes of the training web sites and having features describing the attributes of the legitimate emails received responsive to the submissions of the email addresses to the training web sites; and training the classifier using the feature vectors, the training causing the classifier to learn weights describing relative importances of the features in recognizing when email messages are received in response to email addresses submitted to web sites; and determining whether the email message is spam responsive at least in part to the degree of correlation, a stronger correlation indicating a decreased likelihood that the email message is spam.

9. The computer-readable storage medium of claim 8, wherein the computer program instructions for collecting attributes of the web site to which an email address was submitted comprise instructions for:

collecting one or more primary attributes describing the web site; and collecting one or more secondary attributes derived from the primary attributes.

10. The computer-readable storage medium of claim 9, wherein the primary attributes describing the web site comprise at least one of an IP address and a DNS name of a web server hosting the web site.

11. The computer-readable storage medium of claim 9, wherein the secondary attributes derived from the primary attributes comprise at least one of geolocation data describing a geographic location of a web server hosting the web site, whether an IP address of the web server is known to be associated with an ISP, information about a domain name registrar at which the DNS name for the web server is registered, and information about a registrant of the DNS name.

12. The computer-readable storage medium of claim 8, wherein the computer program instructions for collecting attributes of an email message sent to the email address comprise instructions for:

collecting one or more primary attributes describing the email message; and collecting one or more secondary attributes derived from the primary attributes.

13. The computer-readable storage medium of claim 12, wherein the primary attributes describing the email message comprise at least one of a DNS name of a "from" address of the email message, an IP address of a mail server involved in sending the email message, a DNS name of the mail server involved in sending the email message, and attributes of a mail session involved in transmitting the email message.

14. The computer-readable storage medium of claim 12, wherein the secondary attributes derived from the primary attributes comprise at least one of geolocation data describing a geographic location of the mail server involved in sending the email message, whether the IP address of the mail server is known to be associated with an ISP, information about a domain name registrar at which the DNS of the web server is registered, and information about a registrant of the DNS name.

15. A computer system for detecting spam email messages comprising:

a processor for executing computer program instructions; and a non-transitory computer-readable medium storing executable computer program instructions executable to perform steps comprising:

collecting attributes of a web site to which an email address was submitted;

collecting attributes of an email message sent to the email address;

identifying a degree of correlation between at least one of the collected attributes of the web site and at least one of the collected attributes of the email message, the identifying comprising using a classifier to analyze the at least one collected attribute of the web site and the at least one collected attribute of the email message, wherein the analysis is based at least in part on a plurality of weights describing different values that represent the relative importances of the collected attributes of the web site and email message, wherein the classifier is generated by training on training data describing attributes of training web sites to which email addresses were submitted and legitimate emails received responsive to the submissions of the email addresses to the training web sites, generating the classifier comprising:

generating feature vectors from the training data, the feature vectors having features describing the attributes of the training web sites and having features describing the attributes of the legitimate emails received responsive to the submissions of the email addresses to the training web sites; and training the classifier using the feature vectors, the training causing the classifier to learn weights describing relative importances of the features in recognizing when email messages are received in response to email addresses submitted to web sites; and determining whether the email message is spam responsive at least in part to the degree of correlation, a stronger correlation indicating a decreased likelihood that the email message is spam.

16. The computer system of claim 15, wherein collecting attributes of the web site to which an email address was submitted comprises:

collecting one or more primary attributes describing the web site; and collecting one or more secondary attributes derived from the primary attributes.

17. The computer system of claim 15, wherein the classifier is generated by training on training data describing attributes of web sites to which email addresses were submitted and legitimate emails received responsive to the submissions of the email addresses to the web sites.

18. The method of claim 1, wherein generating the classifier comprises generating a decision tree classifier having a tree structure including branch nodes and leaf nodes, wherein a leaf node represents a classification indicating whether an attribute of a web site is important in spam detection and contains a confidence score measuring a confidence in the represented classification.

* * * * *